US006237905B1

(12) United States Patent
Halder et al.

(10) Patent No.: US 6,237,905 B1

(45) Date of Patent: May 29, 2001

(54) HOLD-DOWN CLAMP

(75) Inventors: Werner Halder, Achstetten-Bronnen; Dieter Hummel, Bad Waldsee, both of (DE)

(73) Assignee: Erwin Halder KG, Achstetten (DE)

(*) Notice: Subject to any disclaimer, the term of this patent is extended or adjusted under 35 U.S.C. 154(b) by 0 days.

(21) Appl. No.: 09/557,339

(22) Filed: Apr. 25, 2000

(30) Foreign Application Priority Data

Apr. 26, 1999 (DE) ........................................... 199 18 696

(51) Int. Cl.[7] ........................................... B23Q 3/08

(52) U.S. Cl. ........................... 269/32; 269/24; 269/27

(58) Field of Search ........................... 269/24, 32, 25, 269/27, 30; 192/93 A; 74/107; 254/98

(56) References Cited

U.S. PATENT DOCUMENTS 2,650,523 * 9/1953 Zwick ................................ 269/32
3,572,216 * 3/1971 Seesody ................................ 269/32
4,238,124 12/1980 Eichfeld .
5,927,700 * 7/1999 Yonezawa ................................ 269/24

* cited by examiner

*Primary Examiner*—Joseph J. Hail, III
*Assistant Examiner*—Lee Wilson
(74) *Attorney, Agent, or Firm*—Herbert Dubno; Andrew Wilford

(57) ABSTRACT

A hold-down clamp has a post extending along an axis and having a lower end adapted to be secured to a work surface and an upper end and a clamping body axially displaceable along the post and formed offset from the axis with at least one seat. A locator ring engaged around the post can be fixed to the post adjacent the body in any of a multiplicity of angularly and axially offset positions. A locator element fixed on the ring is engaged in the seat. The seat is a radially outwardly open notch and the locator element is a small-diameter pin extending parallel to the axis from the locator ring.

8 Claims, 7 Drawing Sheets

HOLD-DOWN CLAMP

FIELD OF THE INVENTION

The present invention relates to a hold-down clamp. More particularly this invention concerns such a clamp used to secure a workpiece to a surface.

BACKGROUND OF THE INVENTION

For many machining and woodworking operations it is necessary to secure a workpiece to a machine bed or work surface. It is standard when the bed is formed of steel to provide it with upwardly open grooves of inverted T-section into which is fitted a T-nut or T-bolt that secures the clamp in place.

Such a clamp typically comprises a post having a lower end that is secured to the work surface. A body is displaceable vertically and axially along this post and normally has an arm whose free end can be brought to bear on the tool or workpiece being clamped to the surface to press it down against the work surface.

In U.S. Pat. No. 4,238,124 of Eichfeld the body is formed as a split ring which can be clamped by circumferential tightening at any angular or axial position on the post. Thus the position, both angular and axial, can be adjusted steplessly. Such a system does not make it possible to accurately duplicate a given angular position which is needed in many setups.

German patent 3,333,813 of Schmid discloses a double-jaw work-surface clamp. A collet arrangement is used to control the height or axial position of the upper jaw, and the lower jaw is movable axially by a bolt extending between the jaws. This system is also steplessly adjustable with no way to reproduce a given angular position.

German patent document 4,321,387 of Wurche describes a positioner having an upright post on which is mounted a ring carrying a radially projecting arm. The post has a single radially outwardly open and axially extending groove in which engages a spring-loaded ball mounted in the spring so as to define one standard angular position for the arm. Such a device is not a hold-down clamp; instead it serves merely for accurately setting the position of a workpiece that is then secured in place by standard hold-down clamps. The vertical or axial position of the arm-carrying ring is changed by moving a pair of abutment rings that axially closely flank it and that are each secured in place by a respective set screw, so that adjusting the vertical position is a laborious operation.

German utility model 297 03 707 assigned to HMC-Brauer Ltd. describes a hold-down clamp having a body that is vertically displaceable to a limited significant extent on the post, and whose free end is provided with an extensible bolt acting as a hold-down foot. The angular position of the arm with respect to the post is fixed by an interfitting axially extending groove and rib respectively formed on the body and post. A tightening lever can vertically displace the body through a short stroke so that, once the device is set the clamping can be effected with a single turn of this lever. This device must be carefully adjusted for each setup and, for a new setup, all the adjustments must be changed. There is no simple way to change the angular orientation of the arm relative to the post.

OBJECTS OF THE INVENTION

It is therefore an object of the present invention to provide an improved hold-down clamp.

Another object is the provision of such an improved hold-down clamp which overcomes the above-given disadvantages, that is which is easy to set up, which can accurately assume any of a plurality of different angular positions, and which is of simple and easy-to-service construction.

SUMMARY OF THE INVENTION

A hold-down clamp has according to the invention a post extending along an axis and having a lower end adapted to be secured to a work surface and an upper end and a clamping body axially displaceable along the post and formed offset from the axis with at least one seat. A locator ring engaged around the post can be fixed to the post adjacent the body in any of a multiplicity of angularly and axially offset positions. A locator element fixed on the ring is engaged in the seat.

Thus with this system the locator element can be positioned and locked in place. The body can be pivoted limitedly, depending on the diameter of the pin and the angular dimension of the seat, between two fixed end positions. Thereafter one workpiece after another can be secured with the hold-down body always assuming the exact same angular position with respect to the post. This is very useful for a run of similar machining operations.

The seat in accordance with the invention is a radially outwardly open notch and the locator element is a small-diameter pin extending parallel to the axis from the locator ring engaged in the seat. The angular dimension of the notch is greater than the diameter of the pin.

The body according to the invention is formed with a plurality of such seats angularly offset from one another. Thus it is possible to establish a series of uniformly offset standard angular positions for the clamp body. In addition it is possible to completely release the means securing the ring to the post so that the body can rotate freely on the post if that is desired.

The body of the clamp in accordance with the invention is formed with a radially inwardly open annular groove and is provided in the groove with a spring ring. The post is formed with an axially downwardly directed surface engageable with the spring ring to limit axial upward movement of the body. Thus the body will not slip accidentally upward off the post. More particularly the post is formed with a radially outwardly open annular groove having an upper flank extending generally perpendicular to the axis and forming the downwardly directed surface engageable with the spring ring and a frustoconical lower surface extending at a small acute angle to the axis so that the spring ring can slide out of the outwardly open groove over the lower flank. This groove system is particularly useful if the clamp is mounted with its axis horizontal or vertical but upside-down, as it prevents an overly loosened clamp from falling apart. The spring ring also increases the friction between the body and post somewhat so that it holds in any set position.

The body is axially displaced along the post by a screw threaded axially in the post and having an arm extending radially from the screw. A roller bearing is braced between the screw and the body. A spring is braced axially between the post and the body and urges the body axially upward.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
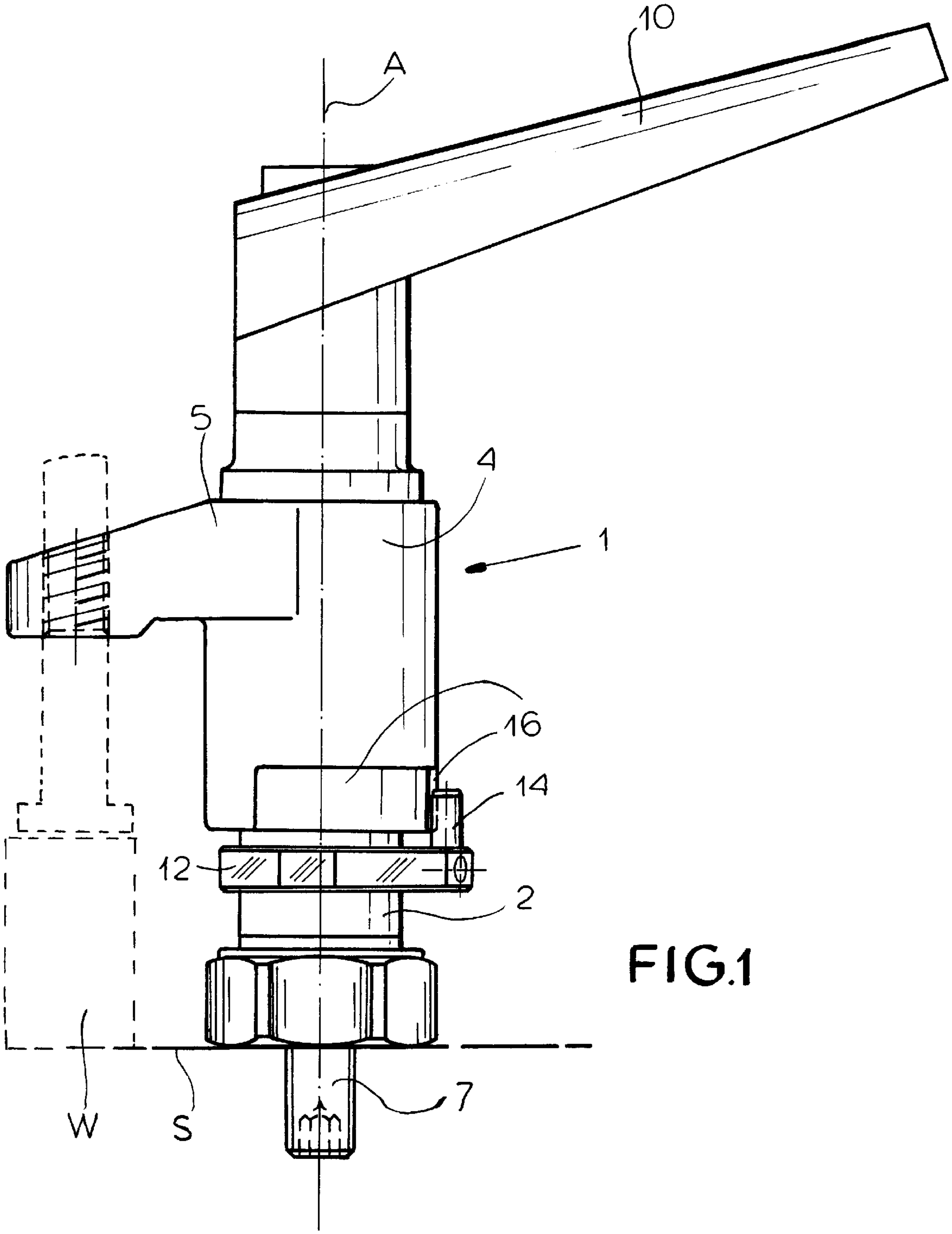
FIG. 1 is a side view of the clamp according to the invention.
Figure 2:
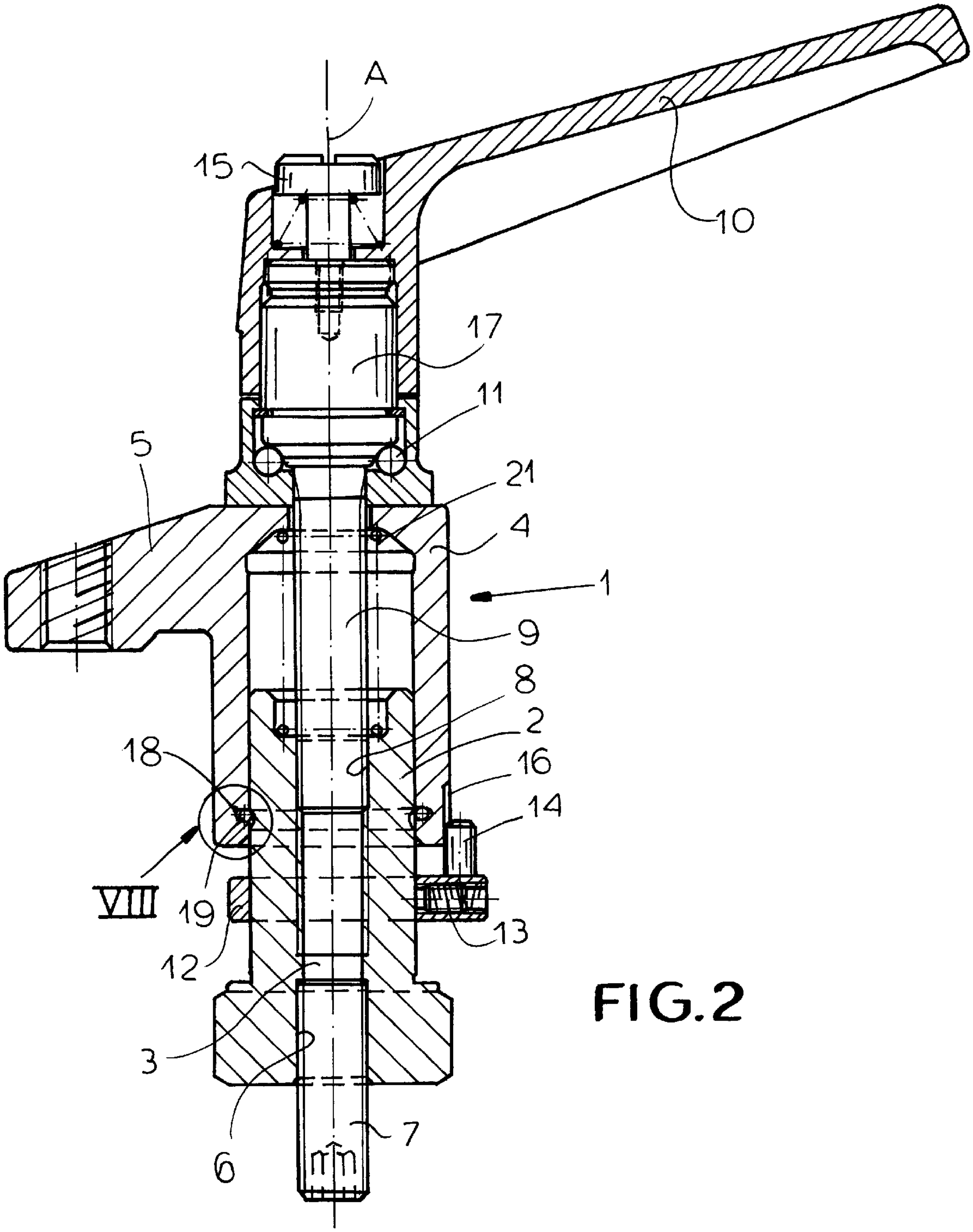
FIG. 2 is a vertical section through the clamp in an upper position.
Figure 3:
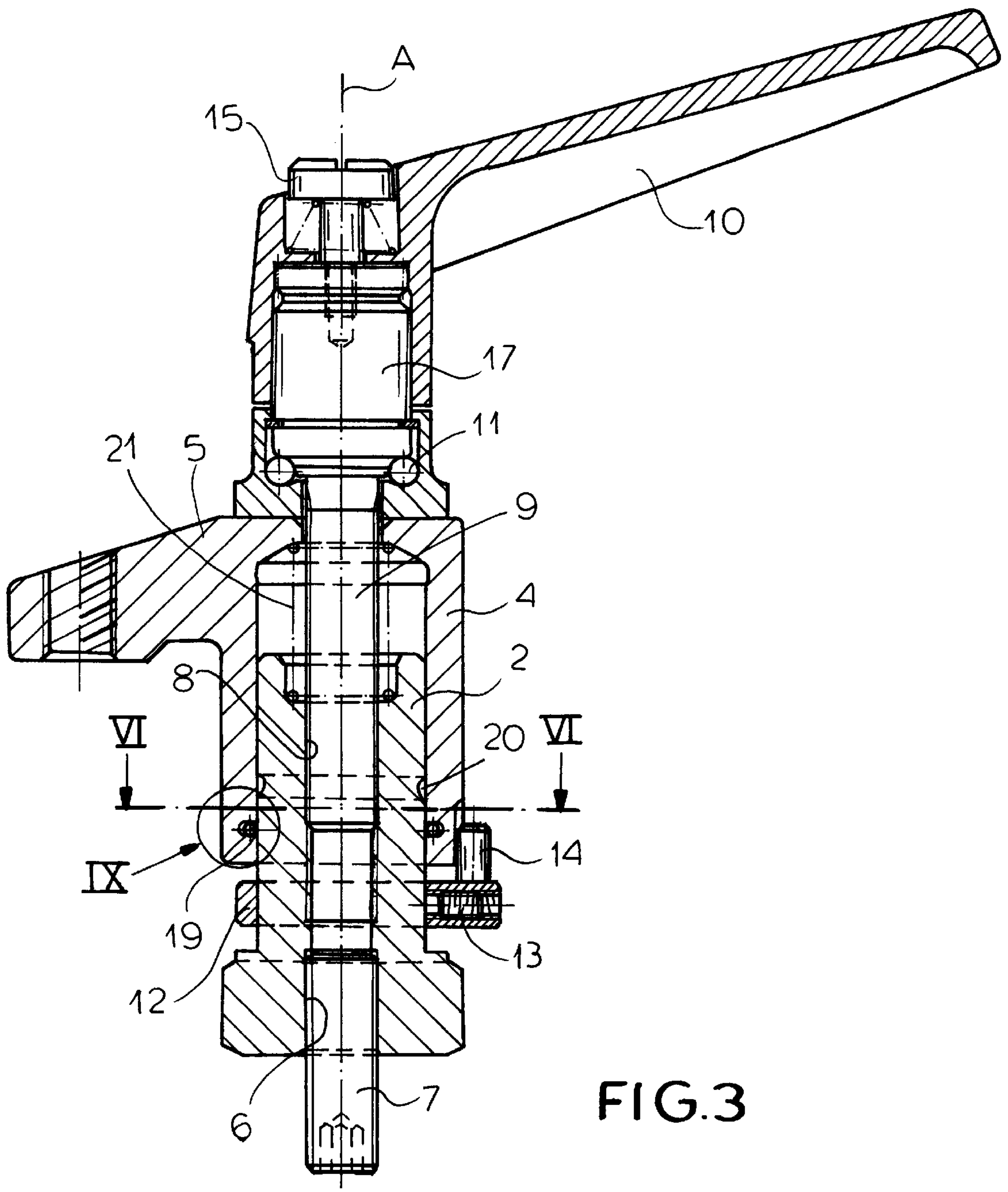
FIG. 3 is a section like FIG. 1 but with the clamp in a lower position.

As seen in FIGS. 1–3 a hold-down clamp 1 according to the invention has a tubular steel post 2 carrying a metallic body 4 and formed with a throughgoing bore 3 centered on a normally vertical axis A. Threads 6 at the lower end of the bore 3 secure a stud 7 that can be screwed into a threaded hole in a support surface S or a T-nut recessed therein. Threads 8 in the upper end of the bore 3 hold a screw or bolt 9 fixed to a handle 10 extending radially of the axis A and bearing via a roller bearing 4 on the upper end of the body 4. A screw 15 extending axially through the handle 10 is seated in an enlarged head 17 of the screw 9 to secure these parts together. A compression spring 21 coaxially surrounds the screw 9 and bears axially downward on the post 2 and upward on the body 4. An arm 5 extending radially from the body 4 can bear directly or via a hold-down screw on a workpiece W to press it against the surface S.

Figure 4:
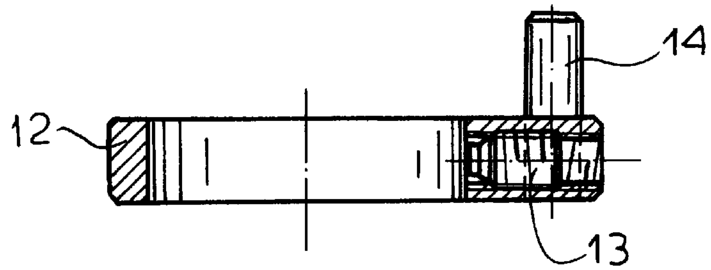
FIG. 4 is a vertical section through a locator ring of the clamp.
Figure 5:
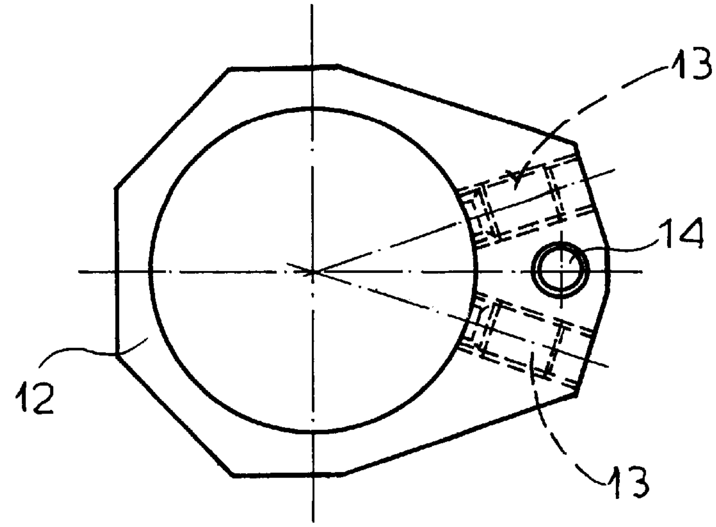
FIG. 5 is a top view of the locator ring
Figure 6:
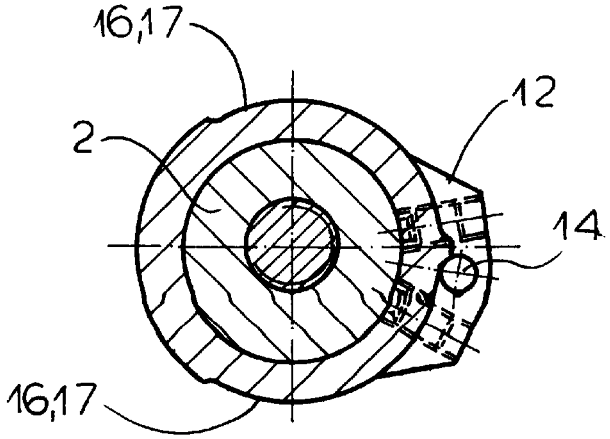
FIG. 6 is a section taken along line VI—VI of FIG. 3.

An annular locator ring 12 also shown in FIGS. 4 to 6 has a cylindrical central hole that fits complementarily on the large-diameter cylindrical outer surface of the post 2 and is provided with a pair of radially directed set screws 13 serving to fix the ring 12 in any angular position on the post 2. This ring 12 carries a small-diameter cylindrical locator pin 14 extending parallel to the axis A and fitting in any of several axially extending and radially outwardly open notches or seats 16 formed in the lower end of the body 2. Each such notch 16 has an angular dimension greater than that of the pin 14 so that the body 2 can pivot relative to the ring 12 to an extent determined by the dimensions of the pin 14 and notch 16.

Figure 8:
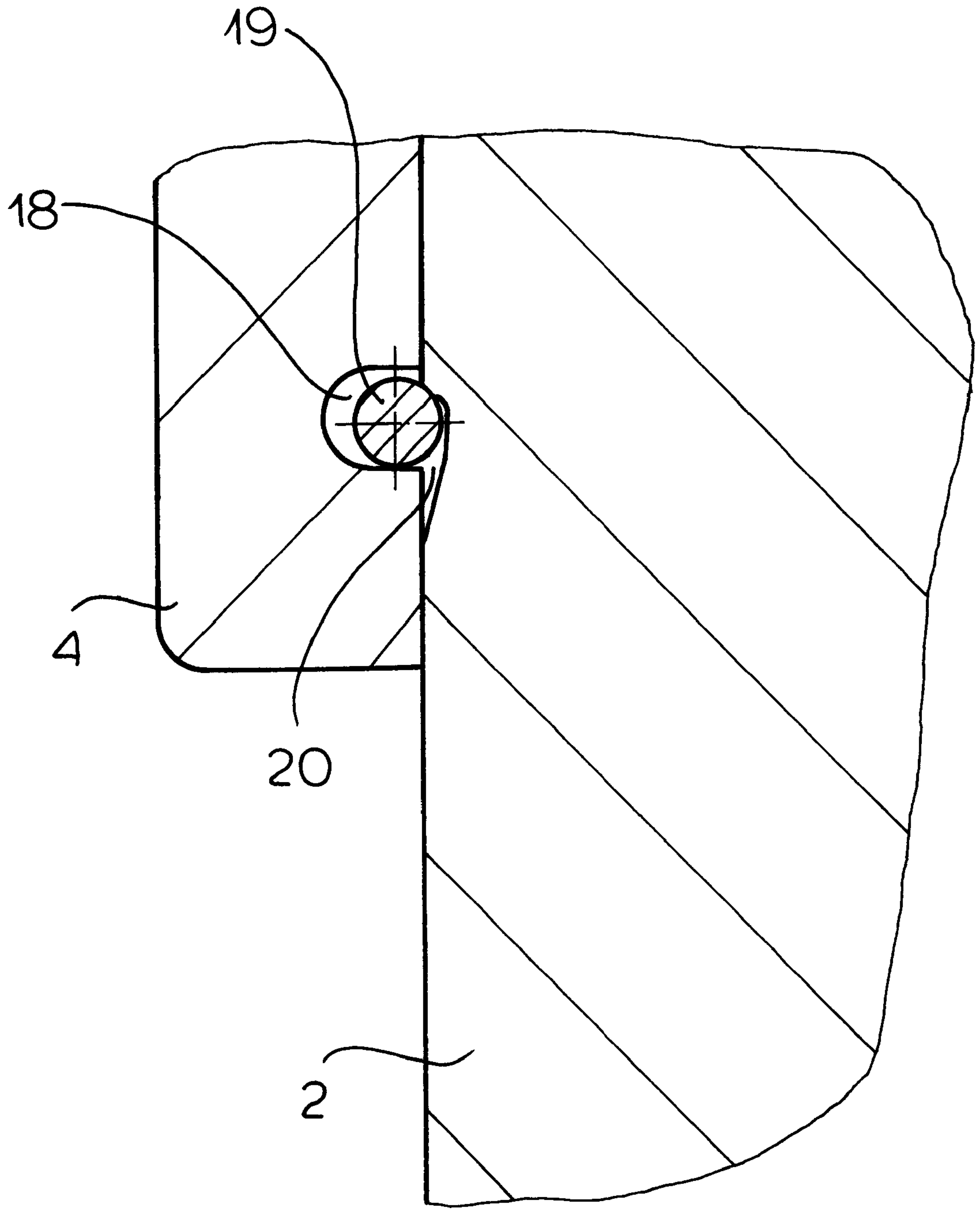
FIGS. 8 and 9 are large-scale views of the details indicated at VIII and IX of FIGS. 2 and 3, respectively.
Figure 9:
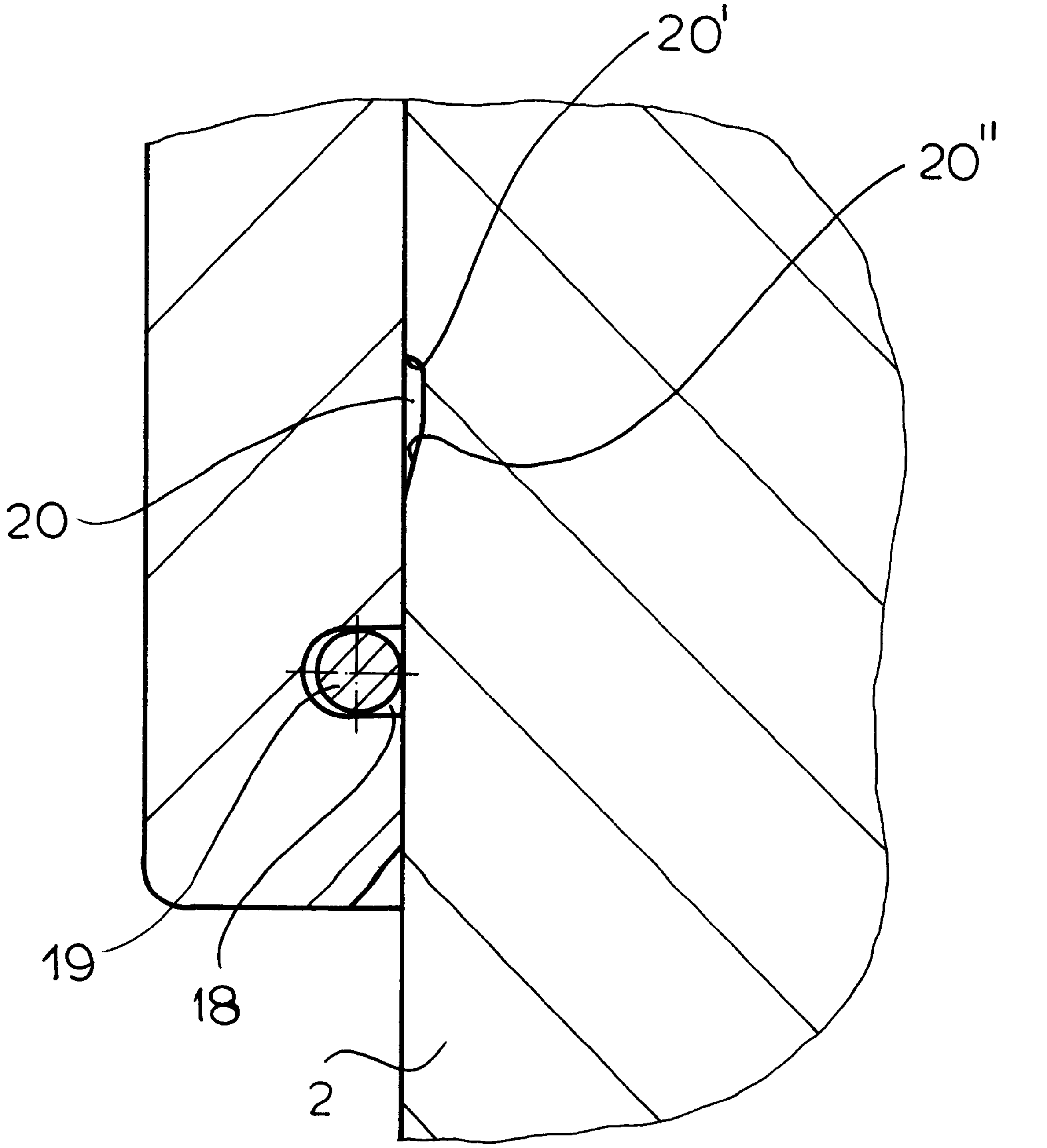

FIGS. 8 and 9 also illustrate how the body 4 is formed with a radial inwardly open annular groove 18 holding a spring ring 19. The post 2 is formed with a radially outwardly open annular groove 20 having an upper flank 20' extending at a right angle to the axis A and a frustoconical lower flank 20" forming a small acute angle to this axis A. These grooves 18 and 20 are positioned such that in the upper position of the body 4 the ring 19 bears against the upper perpendicular groove flank 20' which therefore acts as a stop. Downward movement of the body 4 is not inhibited by the interaction of the ring 19 and groove 20 due to the angled flank 20" over which the spring 19 can slide easily. The springs 19 and 21 are dimensioned such that it is necessary to apply an extra upward force to push the ring 19 upward past the flank 20' in order to disassemble the device 1 for lubricating or other servicing.

Figure 7:
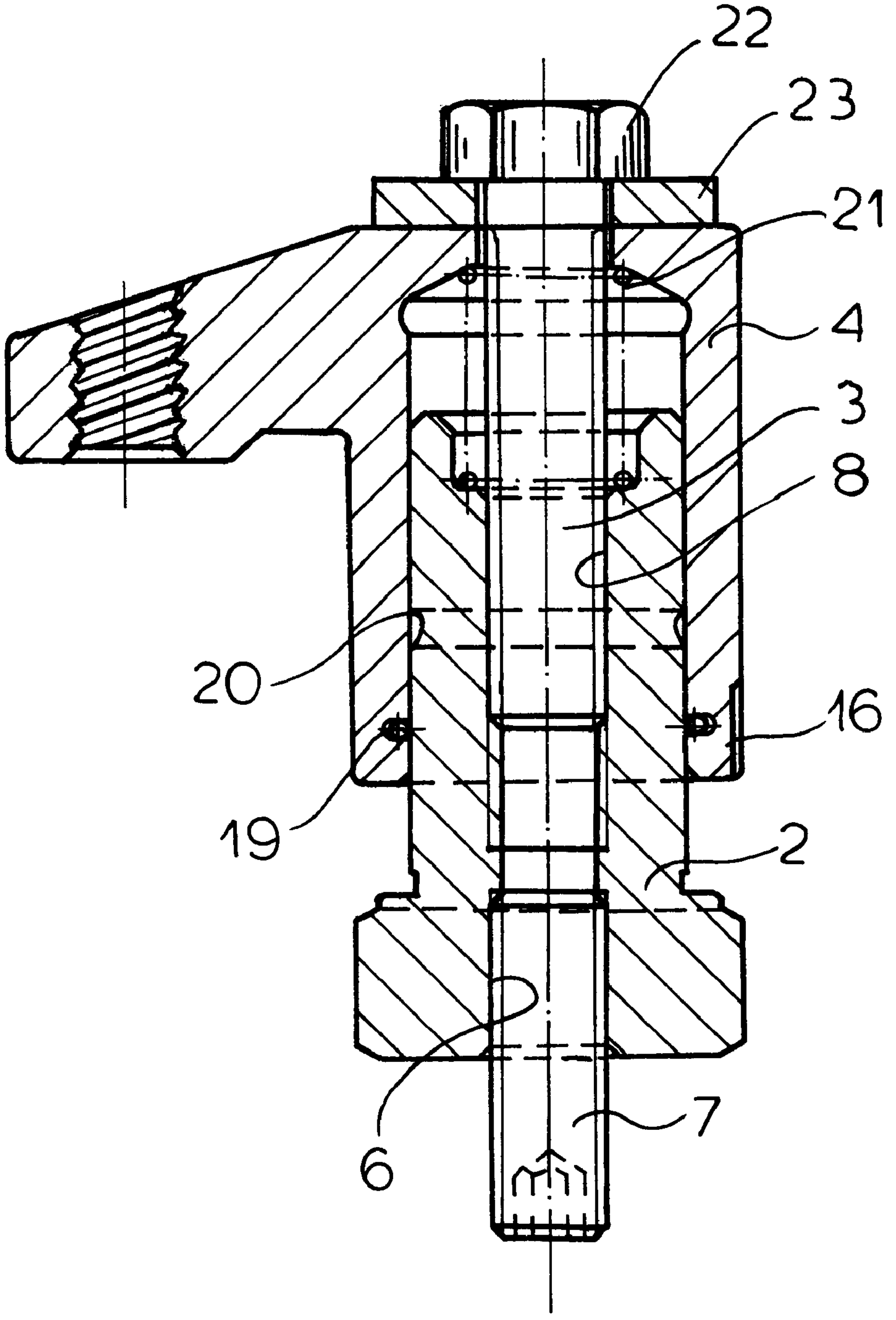
FIG. 7 is a vertical section through another clamp in accordance with the invention.

FIG. 7 shows an arrangement like that of FIGS. 1 to 6, except that there is no handle 10 and screw 9. Instead a simple screw 22 is threaded into the upper threaded region 8 of the bore 3 and bears via a washer 23 on the upper end of the body 4.

We claim:

1. A hold-down clamp comprising:

a post extending along an axis and having a lower end adapted to be secured to a work surface and an upper end;

a clamping body axially displaceable along the post and formed with at least one axially open seat radially offset from the axis;

means for axially displacing the clamping body along the post;

a locator ring engaged around the post;

means for fixing the locator ring to the post adjacent the body in any of a multiplicity of angularly and axially offset positions; and a locator element fixed on the ring, radially offset from the axis, and engaged axially in the seat.

2. The hold-down clamp defined in claim 1 wherein the seat is a radially outwardly open notch and the locator element is a small-diameter pin extending parallel to the axis from the locator ring.

3. The hold-down clamp defined in claim 2 wherein the body is formed with a plurality of such seats angularly offset about the axis from one another.

4. The hold-down clamp defined in claim 1 wherein the body is formed with a radially inwardly open annular groove and is provided in the groove with a spring ring bearing elastically inward on the post, the post being formed with an axially downwardly directed surface engageable with the spring ring to limit axial upward movement of the body.

5. The hold-down clamp defined in claim 4 wherein the post is formed with a radially outwardly open annular groove having an upper flank extending generally perpendicular to the axis and forming the downwardly directed surface engageable with the spring ring and a frustoconical lower surface extending at a small acute angle to the axis, whereby the spring ring can slide out of the outwardly open groove over the lower flank.

6. The hold-down clamp defined in claim 1 wherein the means for axially displacing the body along the post includes a screw threaded axially in the post, an arm extending radially from the screw, and a bearing braced between the screw and the body.

7. The hold-down clamp defined in claim 1, further comprising a spring braced axially between the post and the body and urging the body axially upward.

8. The hold-down clamp defined in claim 1 wherein the body is formed with a radially projecting arm adapted to bear axially downward on a workpiece on the surface adjacent the post.

* * * * *